United States Patent [19]

Sauber

[11] Patent Number: 4,488,696
[45] Date of Patent: Dec. 18, 1984

[54] CABLE CLAMPING DEVICE

[76] Inventor: Charles J. Sauber, 10 N. Sauber Rd., Virgil, Ill. 60182

[21] Appl. No.: 599,600

[22] Filed: Apr. 13, 1984

Related U.S. Application Data

[63] Continuation of Ser. No. 398,067, Jul. 14, 1982.

[51] Int. Cl.³ .................................................. F16L 3/08
[52] U.S. Cl. .................................... 248/74.1; 248/65; 248/72
[58] Field of Search ................. 248/74 R, 316 C, 49, 248/72, 67.7, 65, 154, 56, 524, 525, 526, 158; 403/192, 197; 52/295, 296, 297, 298, 728, 220, 27; 285/64

[56] References Cited

U.S. PATENT DOCUMENTS

| | | | |
|---|---|---|---|
| 1,982,569 | 11/1934 | Byrd | 52/298 |
| 2,875,968 | 3/1959 | Ekola | 248/524 |
| 3,052,065 | 9/1962 | Rettman | 248/56 |
| 3,298,646 | 1/1967 | Van Buren | 248/72 |
| 3,733,040 | 5/1973 | Rocquin | 248/524 |
| 4,007,564 | 2/1977 | Chisholm | 52/295 |
| 4,218,858 | 8/1980 | Legler | 52/298 |
| 4,261,598 | 4/1981 | Cornwall | 285/64 |
| 4,313,286 | 2/1982 | Harbeke | 285/64 |

Primary Examiner—Ramon S. Britts
Assistant Examiner—Ramon O. Ramirez
Attorney, Agent, or Firm—Leydig, Voit, Osann, Mayer & Holt, Ltd.

[57] ABSTRACT

An improved cable clamping device which is suitably adapted to hold and support long hanging electrical cables which extend through a continuous shaft between floors of a high-rise building wherein substantially identical members each including an arcuate portion having flanges at opposite ends and a leg depending from the arcuate portion being first angled outwardly and then downwardly substantially parallel to the flanges and each of the flanges has a boss formed therein with an aperture passing through the boss, preferably with one of the apertures being threaded and the other aperture carrying a captive bolt so that with the arcuate portions positioned about the cable tightening of the two bolts presented on opposite sides forms the assembly whereby the downwardly depending legs rest on a floor and firmly hold and support the cable against descention in the shaft. An alternative simplified form may be provided with the leg extending outwardly at a right angle and then only a slight drop downwardly so that the device can rest on a floor or the top of a conduit piece extending between floors.

6 Claims, 6 Drawing Figures

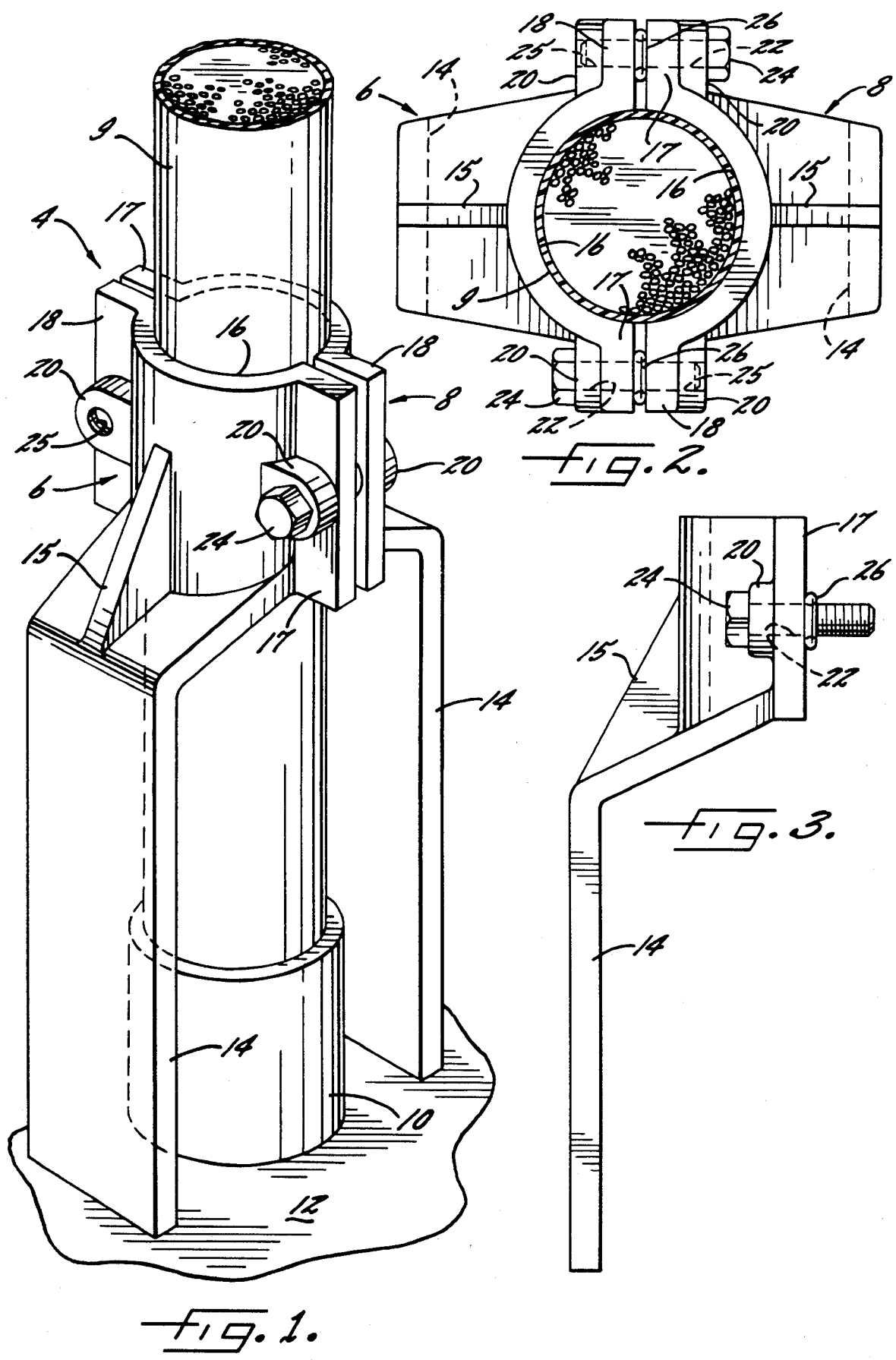

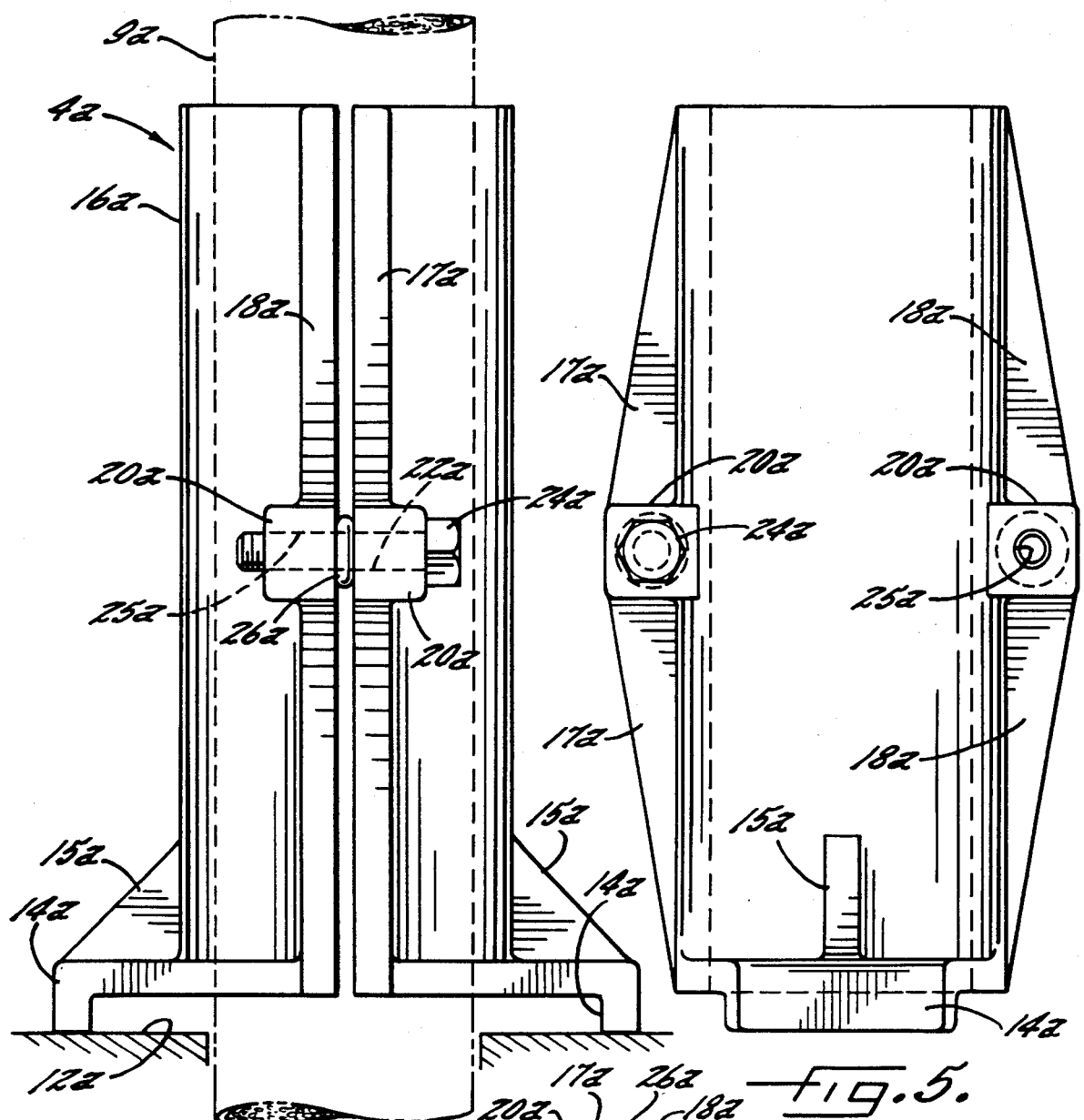
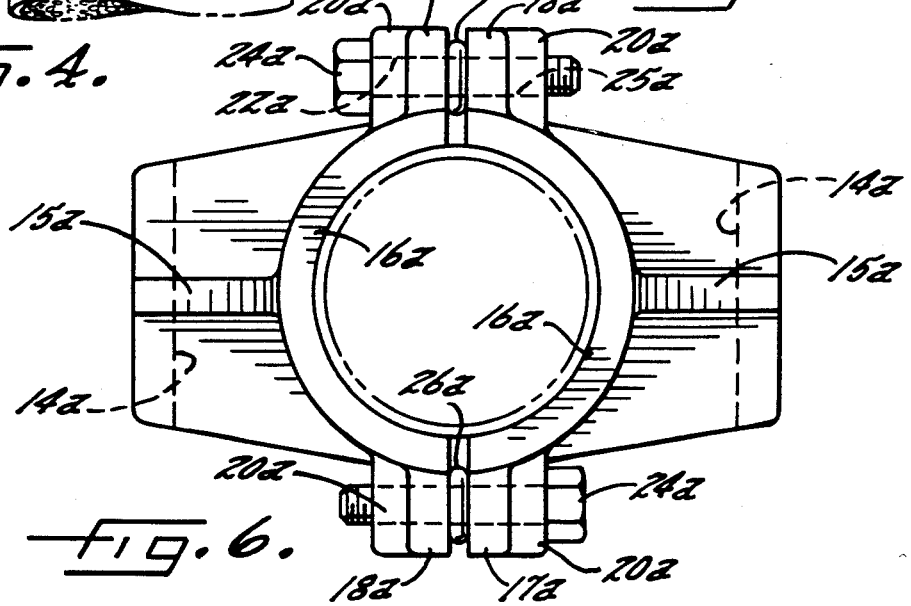

CABLE CLAMPING DEVICE

This application is a continuation of application Ser. No. 398,067, filed July 14, 1982.

FIELD OF THE INVENTION

The present invention relates generally to clamping devices for holding and supporting electrical cable and more particularly to an improved clamping device which is relatively low cost, convenient and simple to install for supporting long hanging cables such as, for example, telephone cables in high-rise buildings.

BACKGROUND OF THE INVENTION

Typically in multi-story or high-rise buildings there are wiring closets which provide a continuous shaft between floors for the long hanging electrical cables which extend from the bottom to the top of the building. In the case of telephone lines, a cable which may contain up to 3600 pairs of wires can be about 3½ inches in diameter and weigh approximately 8 lbs. per lineal foot. Thus, it has been necessary to devise some type of support arrangement that could be installed at least about every fourth floor so that the cummulative weight of the cable extending downwardly from upper floors is not imposed on terminal connections or the wires.

In the past, to keep the cable from descending and supporting the same, a rather complicated, time consuming and hard to install arrangement had been used. Such arrangement involved using a flat woven wire strip that could be wrapped around the cable forming a tube that would be seamed together by a rod inserted through the adjoining looped ends of the wire strip. The formed wire tube would then be taped temporarily to the cable and the lower end of the tube was further fastened with several hose clamps to prevent it from slipping. The upper end of the tube would then be connected to a ceiling or wall with a length of wire and when the weight of the cable through the attachment wire pulled on the tube, the diameter of the tube tended to become reduced to tightly grip the cable. Of course, the required action to cause the tube to squeeze against the cable allowed the cable to lower at least to some extent before making it taut.

OBJECTS OF THE INVENTION

Accordingly, it is an object of the present invention to provide an improved cable clamping device which overcomes the handling difficulties and problems attendant with prior arrangements and is relatively simple to install and saves time, costs and inventory of components.

Another object of the present invention is to provide a clamping device which is essentially a single part that may be readily used in pairs to hold and support a hanging cable.

BRIEF DESCRIPTION OF THE DRAWINGS

Other objects and advantages of the present invention will be apparent from the foregoing description and upon reference to the accompanying drawings in which:

FIG. 1 is a perspective view of a cable clamping and support assembly in accordance with the present invention;

FIG. 2 is a top plan view of the cable clamping assembly shown in FIG. 1;

FIG. 3 is a side plan view of an individual cable clamping device which makes up the assembly shown in FIG. 2;

FIG. 4 is a side plan view of an alternative form of a cable clamping and support assembly in accordance with the present invention;

FIG. 5 is a side plan view of an individual cable clamping device of the assembly shown in FIG. 4; and FIG. 6 is a top plan view of the cable clamping and support assembly shown in FIG. 4.

While the invention will be described in connection with particular preferred embodiments it will be understood that it is not intended to limit the invention to those particular embodiments. On the contrary, it is intended to cover all alternatives, modifications and equivalents as may be included within the spirit and scope of the invention as defined by the appended claims.

DETAILED DESCRIPTION

Turning now to the drawings, FIG. 1 illustrates a cable clamping device assembly, generally indicated at 4, made up of two identical members 6, 8 and constructed in accordance with the invention to clamp onto a hanging cable 9 of the type that extends downwardly through a conduit 10 passing between a building floor 12. The clamping device 4 is positioned in such a manner that it holds and prevents further downward movement of the cable due to outwardly extending legs 14 of the clamping device that rest on the floor 12.

It will be appreciated that use of the conduit 10 is illustrated as one means for passage of a cable between floors of a multi-story building. In some forms of construction a piece of conduit is not used and there are simply aligned openings left in each floor so that the cable hangs down from the top floors through the openings.

Referring to FIG. 2, each one of the component members 6, 8 of the clamping device 4, in accordance with the invention, comprises an arcuate portion 16 having flanges 17, 18 at its opposite ends and a leg 14 depending from the arcuate portion with the leg being first angled outwardly and downwardly and then downwardly substantially parallel to the flanges. To strengthen the members 6, 8, ribs 15 are formed between the legs and arcuate portions. Each of the flanges has a boss 20 formed thereon with an aperture 22 passing transversely through the boss.

In order to permit the use of a pair of identical members 6, 8 to make up the clamping device assembly, it is preferable that one of the boss apertures indicated at 25 is threaded, such as for example the one on the left as viewed in FIG. 1. The other boss aperture, such as the one on the right as viewed in FIG. 1, is left unthreaded and receives a bolt 24 that is preferably held captive by use of an O-ring or washer member 26, as best shown in FIG. 3. Thus, the arrangement is such that it is not necessary to manufacture, stock or use two different clamp elements forming one-half of the to-be-assembled clamping device thereby effecting savings of time and money for all concerned. However, it will be appreciated that the clamp element can be made with one element carrying both bolts and the other element having two threaded apertures for use such as where access for tightening on one side is more convenient or desireable.

In its preferred form the clamping device elements are made of aluminum magnesium castings which provide suitable durability and strength for supporting even the heaviest of electrical hanging cables, yet the clamp elements are sufficiently light in weight that installers are not hampered by not being able to carry a number of the devices from supply to the installation site.

As can be readily appreciated by those skilled in the art, the clamping device can be installed on a hanging cable by simply placing two of the same elements in opposed relation with the arcuate portions positioned about the cable and then tightening the two bolts presented on opposite sides to form the assembly. The downwardly depending legs rest on the floor straddling the opening or conduit through which the cable passes down to the next floor and when the clamping device is securely tightened the cable is firmly held and supported against any further descention. The outwardly angled and then downwardly extending legs provide a sufficient straddling of the typical floor openings or conduits to firmly rest on the building floor.

Turning to FIGS. 4-6, there is shown a modified and more simplified form of the clamping device 4a, which can rest on the floor 12a or sit on top of the conduit 10 as showing in FIG. 1 for holding the cable 9a. In the present instance, the leg 14a is first disposed at a right angle with respect to the arcuate and flanged portion 16a and then only a slightly depending downwardly extending leg portion is provided. With this arrangement, there can be further cost savings not only in material for the clamping assembly, but also in handling and storage of the device.

In addition, the arcuate flanged elements are shown to be more elongated then in the alternative device shown in FIGS. 1-3 and the flanges 17a, 18a are tapered from the centrally located bosses 20a toward the upper and lower ends. It should be apparent to those skilled in the art that these variations are both cosmetic and functional from the standpoint that they can be varied for reaching a desired balance of material and production costs as well as amount of clamping surface needed to support the cable with which the device is used.

I claim as my invention:

1. In combination, a clamp and support assembly for hanging electrical cable in vertical position, and a horizontal building floor having an opening adapted to receive the cable passing through the opening, said assembly comprising a pair of integrally formed cast metal clamping devices each having an arcuate portion engaging the cable with flanges at opposite sides thereof, each flange having aperture means passing therethrough, a leg depending and extending outwardly from the arcuate portion angled first outwardly and then downwardly therefrom to provide an assembly with a pair of legs parallel to each other and to the flanges, and bolt means for securing respective adjacent flanges of an opposed pair of said clamping devices together with the arcuate portions positioned about and clamping a cable therebetween and said legs resting on a member associated with the floor and supporting said arcuate portions of said clamping devices over said floor opening.

2. A combination as claimed in claim 1 wherein the flange apertures means of one clamping device are threaded and the other clamping device flange apertures carry captive bolt means.

3. A combination as claimed in claim 1 wherein each clamping device is identical and has one threaded aperture and a captive bolt carrying aperture.

4. A combination as claimed in claim 1 wherein a reinforcement rib bridges the arcuate portion and said leg of each of said clamping devices.

5. A combination as claimed in claim 4 wherein said arcuate portion, leg and rib of each of said clamping devices are integrally formed as an aluminum magnesium casting.

6. A combination as claimed in claim 1 wherein said outwardly angled portion of said leg is at a right angle to said arcuate portion of each of said clamping devices.

* * * * *